United States Patent [19]
Jalliffier et al.

[11] Patent Number: 6,087,739
[45] Date of Patent: Jul. 11, 2000

[54] TRAIN SET AND AN ELECTRICALLY POWERED TRAIN INCLUDING SUCH A SET

[75] Inventors: François Jalliffier, Genas; Nazzareno Merlonetti, Cravanche, both of France

[73] Assignee: GEC Alsthom Transport SA, Paris, France

[21] Appl. No.: 09/099,946

[22] Filed: Jun. 19, 1998

[30] Foreign Application Priority Data

Jul. 3, 1997 [FR] France .................................. 97 08438

[51] Int. Cl.⁷ ...................................................... B60L 1/00
[52] U.S. Cl. ................................................ 307/28; 191/4
[58] Field of Search .................................. 307/9.1, 12, 17, 307/42, 147, 149, 28, 64; 191/4, 5, 7, 11, 2, 22 R, 23 R; 180/14.1, 14.2, 14.3; 105/49, 25.5, 61

[56] References Cited

U.S. PATENT DOCUMENTS

| | | | |
|---|---|---|---|
| 3,868,909 | 3/1975 | Pelabon | 105/1 R |
| 4,343,522 | 8/1982 | O'Neil | 307/9 |
| 4,795,859 | 1/1989 | Kato et al. | 191/4 |
| 5,216,285 | 6/1993 | Hilsenteger et al. | |

FOREIGN PATENT DOCUMENTS

| | | |
|---|---|---|
| 516 125 | 4/1921 | France . |
| 1 094 783 | 12/1960 | Germany . |

*Primary Examiner*—Jeffrey Gaffin
*Assistant Examiner*—Roberto Rios
*Attorney, Agent, or Firm*—Sughrue, Mion, Zinn, Macpeak & Seas, PLLC

[57] ABSTRACT

A train set includes a plurality of cars each having a flat designed to receive storage units equipped electrically-powered equipment. The train set includes: a connector for connecting the set to an electricity source which delivers electrical power at a high voltage greater than the rated operating voltage of the equipment; transfer apparatus for transferring electrical power at a high voltage to each car; a voltage step-down circuit connected to the transfer apparatus and from which electrical power is delivered at a low voltage in the vicinity of the rated operating voltage of the equipment; and a distributor for distributing the low-voltage electrical power to each item of electrically-powered equipment. It is also possible to provide a stand-alone generator providing, in particular, redundancy for the electrical power supply for the distributor. The train set is particularly applicable to transporting liquid or solid perishable goods, as well as chemicals, under controlled temperature.

15 Claims, 2 Drawing Sheets

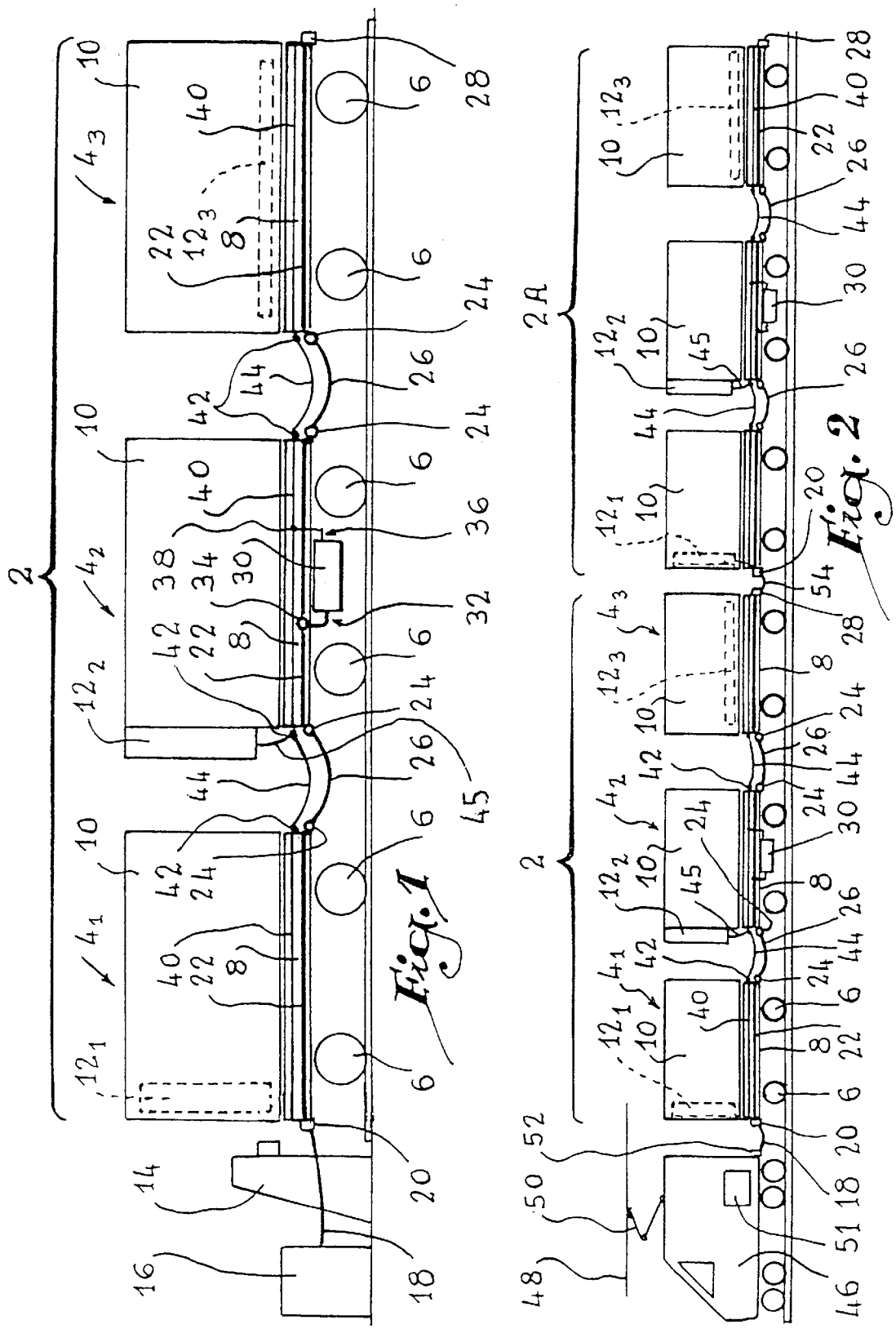

TRAIN SET AND AN ELECTRICALLY POWERED TRAIN INCLUDING SUCH A SET

FIELD OF THE INVENTION

The present invention relates to a train set of the type comprising a plurality of cars each comprising a flat designed to receive storage units, in particular for storage under controlled temperature, the cars or the storage units being equipped with electrically-powered equipment.

In the context of the invention, the term "storage units" is used to designate, for example, containers, boxes, semi-trailers that can be picked up by grabs, trailers, or other road units suitable for being disposed on rail cars of the "well-wagon" or "depressed-center" type.

BACKGROUND OF THE INVENTION

Such storage units are used in particular for transporting perishable goods by air, sea, rail, or road. Such storage units are equipped with electrically-powered equipment which makes it possible, inter alia, to maintain a controlled temperature inside the units, thereby guaranteeing that the transported goods remain unspoilt.

When transporting such units by rail, one solution consists in equipping the storage units with electricity generator sets having diesel engines. Unfortunately, such engines give off a large amount of pollution to the ambient air, and they are noisy. That solution also suffers from the disadvantage inherent to the presence of a large number of separate items of equipment, giving rise to extra costs related in particular to managing such electricity generator sets, and giving rise to problems of taking up extra space and of constituting an extra load, thereby reducing the storage unit payload. Finally, such electricity generator sets can run only for a restricted time before they need refueling, and they require periodic maintenance.

Document FR-A-2 696 558 discloses stand-alone apparatus for self-service delivery of electricity in the field of road transport. However, that document only makes reference to powering a single item of electrically-powered equipment when the vehicle is parked. It does not provide a solution to the problem of electrically powering a train set in running order.

OBJECT AND BRIEF SUMMARY OF THE INVENTION

In order to mitigate the above-mentioned drawbacks of the prior art, an object of the invention is to provide a train set for which the electrical power supply is reliable, compact, and capable of running for a long time.

To this end, the invention provides a train set of the above-mentioned type, wherein said train set comprises:

connection means for connecting said set to an electricity source for delivering electrical power at a high, first voltage greater than the rated operating voltage of said electrically-powered equipment;

transfer means for transferring electrical power at said high voltage to each car;

voltage step-down means provided with an inlet connected to said transfer means for transferring electrical power at said high voltage, and with an outlet from which electrical power is delivered at a low, second voltage in the vicinity of the rated operating voltage of said electrically-powered equipment; and distributor means for distributing the low-voltage electrical power to each item of electrically-powered equipment.

The invention makes it possible to achieve the above-mentioned objects. It enables each item of electrically-powered equipment to be powered reliably. regardless of whether it is powered when in running order from the catenary, or when on a siding by means of a stationary power supply unit.

Furthermore, the power supply apparatus of the invention takes up only a small amount of extra space in the train set.

The invention makes it possible to power any number of train sets because such sets can be connected together. In addition, the train sets may be disposed in any order insofar as the connection elements between the sets are identical.

The power supply apparatus of the invention generates almost no noise, and almost no pollution, it enables the train sets to make use of tunnels, and it reduces maintenance and increases the time for which the power supply can operate without external intervention.

The train set of the invention may include one or more of the following characteristics:

the high-voltage electricity source is associated with a locomotive for hauling said train set; this embodiment makes it possible to power the equipment when the train set is in running order;

the means for connecting the train set to the source associated with the locomotive comprise a first coupler disposed on the set, a second coupler disposed on the locomotive, a high-voltage electrical cord interconnecting said first and second couplers, and connection means for connecting the source to the second coupler;

the electricity source is a stationary high-voltage power supply unit; this embodiment makes is possible to power the equipment when the train set is on a siding, e.g. at a rail terminal;

the connection means for connecting the train set to the stationary high-voltage power supply unit comprise a coupler disposed on the train set, and connected to said stationary unit via a high-voltage electrical cord;

the transfer means for transferring high-voltage electrical power to each car comprise high-voltage electrical lines interconnecting high-voltage terminals disposed at the ends of each car, and high-voltage electrical cords interconnecting the high-voltage terminals of the adjacent ends of adjacent cars.

the voltage step-down means are associated with a converter; and the distributor means for distributing the electrical power at low voltage comprise low-voltage electrical lines interconnecting low-voltage terminals disposed at either end of each car, low-voltage electrical cords interconnecting the low-voltage terminals of the adjacent ends of adjacent cars, and electrical connection means for electrically connecting each flat to its corresponding storage unit.

In an advantageous aspect of the invention, at least one of the cars is provided with a stand-alone generator suitable for delivering electrical power at said low voltage.

The stand-alone generator is constituted by a heat engine, e.g. a piston or a turbine engine, coupled directly or otherwise to an alternator or to a DC generator, so as to perform its function as an electricity generator set delivering the low voltage. To perform a stand-alone traction function and a stand-alone braking function, the heat engine may be coupled directly or otherwise to hydraulic components (motor-driven pump, motor, gearbox, etc.), to electrical components (transformer, rectifier, chopper or inverter, DC or AC motor, etc.) or to mechanical components (transmission shaft(s), gearbox, positive clutches, brakes, etc.), depending on the type of propulsion that is chosen.

The traction may be provided either by one of the motors of the locomotive, or else by one or more motors situated on the car supporting the stand-alone generator, so as to drive one or more axles of the car.

The stand-alone generator is thus a rotary machine, e.g. of the diesel-alternator type, of the turbo-alternator type, or of the diesel-generator type. The stand-alone generator may optionally be remote controlled by radio.

According to another characteristic of the invention, the outlet of said stand-alone generator is connected to the distributor means for distributing the electrical power at low voltage. The stand-alone generator thus performs an electricity generator set function and provides redundancy for the power supply of the distributor means for distributing the low-voltage electrical power. This makes it possible to mitigate any failure of the voltage step-down means, or the absence of a stationary high-voltage power supply unit at the rail terminal, or else the absence of a high-voltage outlet in the locomotive hauling the train set.

In another advantageous aspect of the invention, with the train set comprising at least one car provided with a well or a depressed center for receiving a road trailer, the voltage step-down means and/or said standalone generator are disposed in said well. This makes it possible to rehabilitate well wagons, also referred to as "depressed-center cars", that have been made obsolete because of their dimensions which no longer match the trailers that they are to receive.

The invention also provides an electrically powered train comprising a locomotive and a plurality of train sets, each set being made up of a plurality of cars, said train being wherein each train set is as described above, and wherein high-voltage electrical power connection means are provided between two adjacent train sets.

The connection means between two train sets may comprise high-voltage couplers disposed at the adjacent ends of adjacent train sets, and interconnected via high-voltage cords.

According to another characteristic of the invention, the outlet of the stand-alone generator is connected to a drive unit of the locomotive. This makes it possible to power the locomotive in stand-alone manner by means of the power delivered by the generator. The generator is then suitable for propelling the entire train, e.g. by powering one of the axles of the locomotive. This is particularly advantageous on entering or leaving a non-electrified terminal, or when a train is moving with the pantograph of its locomotive lowered.

In another aspect of the invention, another low-voltage electrical line, disposed in the car equipped with the generator, and another low-voltage electrical cord, connecting said car to the locomotive, are interposed between the outlet of the stand-alone generator and the drive unit. Said drive unit is then powered by means of the low voltage delivered by the generator, thereby enabling the locomotive to move slowly.

In a second aspect of the invention, voltage step-up means for stepping up the low voltage delivered by the stand-alone generator are interposed between the outlet of the stand-alone generator and the drive unit of the locomotive. These step-up means which are constituted, for example, by a step-up transformer, make it possible to raise the voltage delivered by the generator to a value in the vicinity of 2000 volts, for example, thereby enabling the locomotive to haul the train at relatively low speeds. The means for stepping up the low voltage output by the stand-alone generator may be disposed either on the car equipped with the generator, or directly on the locomotive.

BRIEF DESCRIPTION OF THE DRAWINGS

The invention is described below with reference to the accompanying drawings which are given merely by way of example, and in which:

FIG. 1 is a diagrammatic view of a train set of the invention, the set being electrically powered by a stationary unit;

FIG. 2 is a diagrammatic view of an electrically powered train comprising two train sets of the invention, the sets being electrically powered by a catenary.

MORE DETAILED DESCRIPTION

Figure 3:
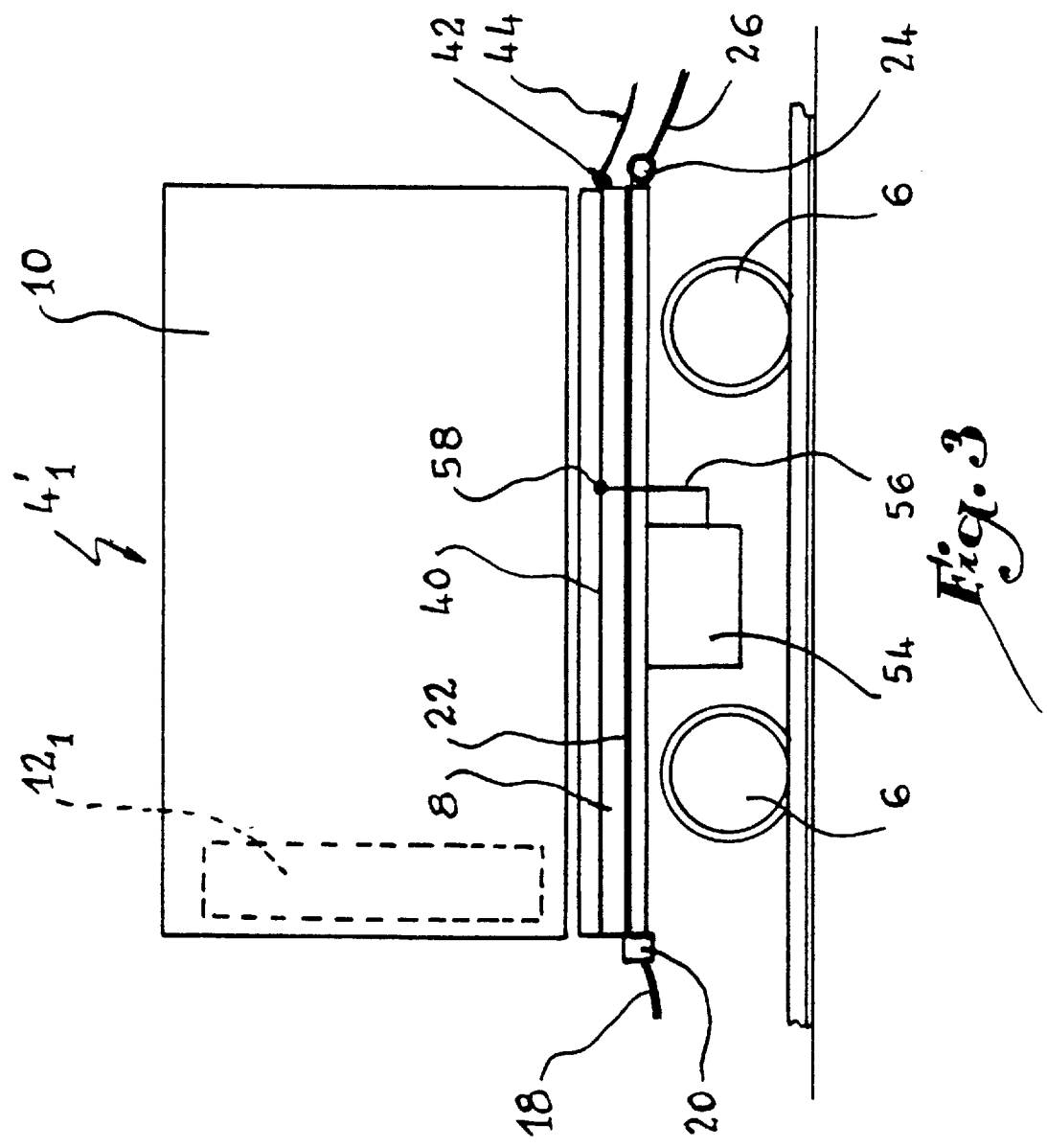
FIG. 3 is a diagrammatic view on a larger scale than that of FIG. 1, showing a car belonging to a variant embodiment of a train set of the invention.

FIG. 1 shows a train set of the invention, the set being designated by overall reference 2. The set is made up of three cars 4, each of which has wheels 6 under a flat 8 on which there stands a substantially rectangular storage unit 10. Naturally the unit may be of arbitrary shape, and in particular it may be cylindrical.

Each storage unit 10 is secured to its flat 8 by means of standard fixing systems optionally supplemented by positioning devices such as stowing pieces and supports for being grasped by grabs. These various elements are well known, and are therefore not shown.

Each storage unit is equipped with an item of electrically-powered equipment 12 suitable for being electrically powered at a voltage in the vicinity of 380 volts.

The nature of each item of electrically-powered equipment depends on the temperature at which the perishable goods must be stored in the units.

In the example shown, there is thus an electric refrigerator set $12_1$ making it possible to maintain a temperature in the vicinity of –25° C., a diesel-and-electric refrigerator set $12_2$ organized for use in diesel mode during road transport, and in electric mode during rail transport, and maintaining a temperature in the vicinity of 7° C., e.g. for transporting fruit, and finally a heater floor $12_3$ making it possible to prevent the goods contained in the corresponding storage unite from freezing.

It is also possible to provide a unit constituted by a heater tank enabling resins or chemicals to be transported at temperatures as high as 220° C., as a function of the nature of the transported goods.

The train set is shown on a siding, in the immediate vicinity of buffers 14. In the remainder of the description, and to make the description clearer, it is assumed that the leading end of the train set is adjacent to the buffers so that the car $4_1$ is the leading car, the car $4_2$ is the intermediate car, and the car $4_3$ is the trailing car.

The train set is connected to a stationary power supply unit 16 delivering electricity at a voltage in the vicinity of 1500 volts which is referred to below as "high voltage", and which is in common use in rail transport. The power supply unit 16 may be installed permanently, but it may also be transportable, e.g. by semi-trailer.

The means for connecting the power supply unit 16 to the train set 2 are constituted by a high-voltage cord 18, a first end of which is connected to the power supply unit 16, the second end being connected to a high-voltage coupler 20 disposed at the leading end of the first car $4_1$ of the set.

The train set is provided with means for transferring high-voltage electricity to each car. These transfer means comprise electrical lines 22 interconnecting the facing ends of the respective cars, and high-voltage terminals powered by the lines 22 and disposed respectively at the trailing end of the leading car $4_1$ at both ends of the intermediate car $4_2$, and at the leading end of the trailing car $4_3$. High-voltage cords 26 analogous to the cord 18 further interconnect the terminals 24 disposed on the respective adjacent ends of the leading car and of the intermediate car, as well as of the intermediate car and of the trailing car.

A high-voltage coupler 28 is provided at the trailing end of the trailing car 43 so as to connect the entire train set 2 to an analogous train set, as explained below with reference to FIG. 2 for the purposes of transferring high-voltage electricity.

An electronics box providing on-board power and data-processing is disposed on the intermediate car $4_2$. The inlet 32 of the box is connected to the high-voltage line 22 via the high-voltage terminal 34, and is thus powered with high-voltage electricity. The box 30 includes voltage step-down means associated with a converter, so that the outlet 36 of the box delivers electrical power at a voltage that is significantly lower than the input voltage. The output voltage, referred to as "low voltage" by convention, is in this case substantially equal to 380 volts, three-phase, and at a frequency of 50 hertz or 60 hertz.

The outlet 36 of the box 30 makes it possible to feed a low-voltage line 40 via a low-voltage terminal 38, the low-voltage line extending from one end of each car in the set 2 to the other. Like the high-voltage line 22, the low-voltage line 40 is disposed between low-voltage terminals 42 provided at the leading end and at the trailing end of the intermediate car, as well as at the leading end of the trailing car and at the trailing end of the leading car. The adjacent low-voltage terminals of adjacent cars are further interconnected by low-voltage cords 44.

Each item of equipment 12 is electrically powered via an electrical connector (not shown) making it possible to connect the flat 8 to the corresponding storage unit 10. For example, such an electrical connector may be as described in the Applicant's document FR-A-2 707 804, or else it may be manually operated or of any other type. The electrical connector may be associated with a low-voltage terminal 42 as is the case at the trailing end of the leading car, at the leading and trailing ends of the intermediate car, and at the leading end of the trailing car, and it may be connected to the electrically-powered equipment by a low-voltage cord 45.

FIG. 2 shows a train in running order, the train being made up of two car sets 2, 2A identical to the set described with reference to FIG. 1. The sets are hauled by a locomotive 46 electrically powered from a catenary 48 via a pantograph 50.

The locomotive 46 is provided with a high-voltage electrical power source 51 for powering the train sets 2, 2A, which source delivers a voltage in the vicinity of 1500 volts, in a manner analogous to that of the stationary power supply unit shown in FIG. 1. This source 51 is itself powered by the catenary 48 and it includes voltage step-down means when the catenary delivers a voltage significantly higher than 1500 volts.

The example shown makes reference to an electric locomotive only. However, the invention is also applicable to locomotives driven by other types of energy. The source 51 is then placed downstream from means for converting the driving energy into electrical energy, such as an alternator when the locomotive is a diesel locomotive.

As shown in FIG. 2, the high-voltage line 22 of the set 2 is powered by the source 51 associated with the locomotive 46. For this purpose, a coupler 52 analogous to the coupler 20 disposed on the leading end of the leading car of the first set 2, is provided at the trailing end of the locomotive 46. This coupler 52 is electrically connected to the coupler 20 via the cord 18 which, when the train set is powered on a siding, is connected to the power supply unit 16. The coupler 52 is also electrically connected to the pantograph 50 via well known means (not shown).

In the same way as when it is powered by the stationary unit 16 shown in FIG. 1, each item of equipment 12 is powered via the high-voltage line 22, via the on-board power and data-processing electronics box 30, via the low-voltage line 40, and via means (not shown) for electrically connecting each flat 8 to its associated storage unit 10.

In addition, the train set 2 makes it possible for the train set 2A to be electrically powered at high voltage by means of co-operation between the high-voltage couplers 28 and 20 provided respectively at the trailing end of the set 2 and at the leading end of the set 2A, and a high-voltage cord 54 electrically interconnecting the two couplers.

The set 2A is thus electrically powered at high voltage, thereby enabling each of its items of equipment 12 to operate, in a manner analogous to that described above for the train set 2. The set 2A is also suitable for electrically powering at high voltage an additional train set (not shown) by means of the high-voltage coupler 28 placed at its trailing end, which coupler may be connected to a high-voltage coupler of the additional train set (not shown).

FIG. 3 shows a car belonging to a variant embodiment of a train set of the invention. This car is given overall reference $4'_1$, and it is substantially analogous to the leading car $4_1$ of the preceding figures, elements that are common to these two cars being designated by like reference numbers.

The car $4'_1$ further includes a stand-alone generator 54 secured to the bottom face of the flat 8. The generator is shown diagrammatically in FIG. 3, and it includes a heat engine and associated equipment, namely a starter system operating by a starter motor, a battery, or a charger, a fuel-regulating system and a fuel tank for a fuel such as gas-oil or liquefied gas. If necessary, the generator is further equipped with a centrifugal clutch or with a transmission, as well as with a radio remote-control system.

The outlet 56 of the generator 54 is connected to the low-voltage line 40 extending along the car $4'_1$ via a low-voltage terminal 58. The low-voltage electricity delivered by the generator 54 can thus be transmitted along the train set, so as to power the items of electrically-powered equipment 12, in particular in the event that the box 30 fails. However, interrupter means are provided so that the generator 54 cannot operate at the same time as the converter with which the box 30 is equipped.

It is also possible to connect the outlet 56 to another low-voltage line analogous to the low-voltage line 40, then to connect said other line to the locomotive 46 so as to power it at low voltage. It is also possible to provide voltage step-up means for stepping up the voltage delivered by the outlet 56 of the generator 54, and then to direct the resulting high-voltage power to the locomotive.

It is also possible to connect the outlet 56 of the generator 54 directly to a motor situated on the axle of one of the wheels 6. The generator 54 then drives the train set, in a manner analogous to that encountered in trams or trolleybuses.

The invention is not limited to the examples described and shown. It is applicable to storage units of any type, and in particular of any shape, in particular non-rectangular.

Naturally, the number of cars making up each set, and the number of train sets making up the train are variable. It is also possible to consider providing electricity sources and electrically-powered equipment whose voltages are different from those mentioned in the description.

Finally, the invention does not apply exclusively to storage units for storage under controlled temperature, insofar as the apparatus of the invention may power other types of electrically-powered equipment in a train set. By way of example, such other types of equipment may be constituted by "intelligent" equipment equipping the care themselves, such as electro-pneumatic or electronic brakes, anti-jamming systems, hot-box detectors, real-time alarm transmission systems guaranteeing improved freight safety, and tracking systems for locating train the sets and the storage units.

What is claimed is:

1. A train set of the type comprising a plurality of cars each comprising a flat designed to receive storage units, in particular for storage under controlled temperature, said cars or said storage units being equipped with electrically-powered equipment, said train set comprising:

connection means for connecting said set to an electricity source for delivering electrical power at a high voltage greater than the rated operating voltage of said electrically-powered equipment;

transfer means for transferring electrical power at said high voltage to each car;

voltage step-down means provided with an inlet connected to said transfer means for transferring electrical power at said high voltage, and with an outlet from which electrical power is delivered at a low voltage in the vicinity of the rated operating voltage of said electrically-powered equipment; and distributor means for distributing the low-voltage electrical power to each item of electrically-powered equipment.

2. A train set according to claim 1, wherein the high-voltage electricity source is associated with a locomotive for hauling said train set.

3. A train set according to claim 2, wherein the means for connecting the train set to the source associated with the locomotive comprise a first coupler disposed on the set, a second coupler disposed on the locomotive, a high-voltage electrical cord interconnecting said first and second couplers, and connection means for connecting the source to the second coupler.

4. A train set according to claim 1, wherein the electricity source is a stationary high-voltage power supply unit.

5. A train set according to claim 4, wherein the connection means for connecting the train set to the stationary high-voltage power supply unit comprise a coupler disposed on the train set, and connected to said stationary unit via a high-voltage electrical cord.

6. A train set according to claim 1, wherein the transfer means for transferring high-voltage electrical power to each car comprise high-voltage electrical lines interconnecting high-voltage terminals disposed at the ends of each car, and high-voltage electrical cords interconnecting the high-voltage terminals of the adjacent ends of adjacent cars.

7. A train set according to claim 1, wherein the voltage step-down means are associated with a converter.

8. A train set according to claim 1, wherein the distributor means for distributing the electrical power at low voltage comprise low-voltage electrical lines interconnecting low-voltage terminals disposed each end of each car, low-voltage electrical cords interconnecting the low-voltage terminals of the adjacent ends of adjacent cars, and optionally electrical connection means for electrically connecting each flat to its corresponding storage unit.

9. A train set according to claim 1, wherein at least one of the cars is provided with a stand-alone generator suitable for delivering electrical power at said low voltage.

10. A train set according to claim 9, wherein an outlet of said stand-alone generator is connected to the distributor means for distributing the electrical power at low voltage.

11. An electrically powered train comprising a locomotive and a plurality of train sets, each set being made up of a plurality of cars, wherein each train set is as defined in claim 1, and high-voltage electrical power connection means are provided between two adjacent train sets.

12. A train according to claim 11, wherein the connection means between two train sets comprise high-voltage couplers disposed at the adjacent ends of adjacent train sets, and interconnected via high-voltage cords.

13. A train according to claim 11, wherein at least one of the cars is provided with a stand-alone generator suitable for delivering electrical power at said low voltage, and wherein an outlet of the stand-alone generator is connected to a drive unit of the locomotive.

14. A train according to claim 13, wherein another low-voltage electrical line, disposed in the car equipped with the generator, and another low-voltage electrical cord, connecting said car to the locomotive, are interposed between the outlet of the stand-alone generator and said drive unit.

15. A train according to claim 13, wherein voltage step-up means for stepping up the low voltage delivered by said stand-alone generator are interposed between the outlet of the stand-alone generator and said drive unit.

* * * * *